Aug. 11, 1942. A. B. ASCH 2,292,861
DIVIDED BED AND CLEANER
Filed Sept. 9, 1939 4 Sheets-Sheet 2
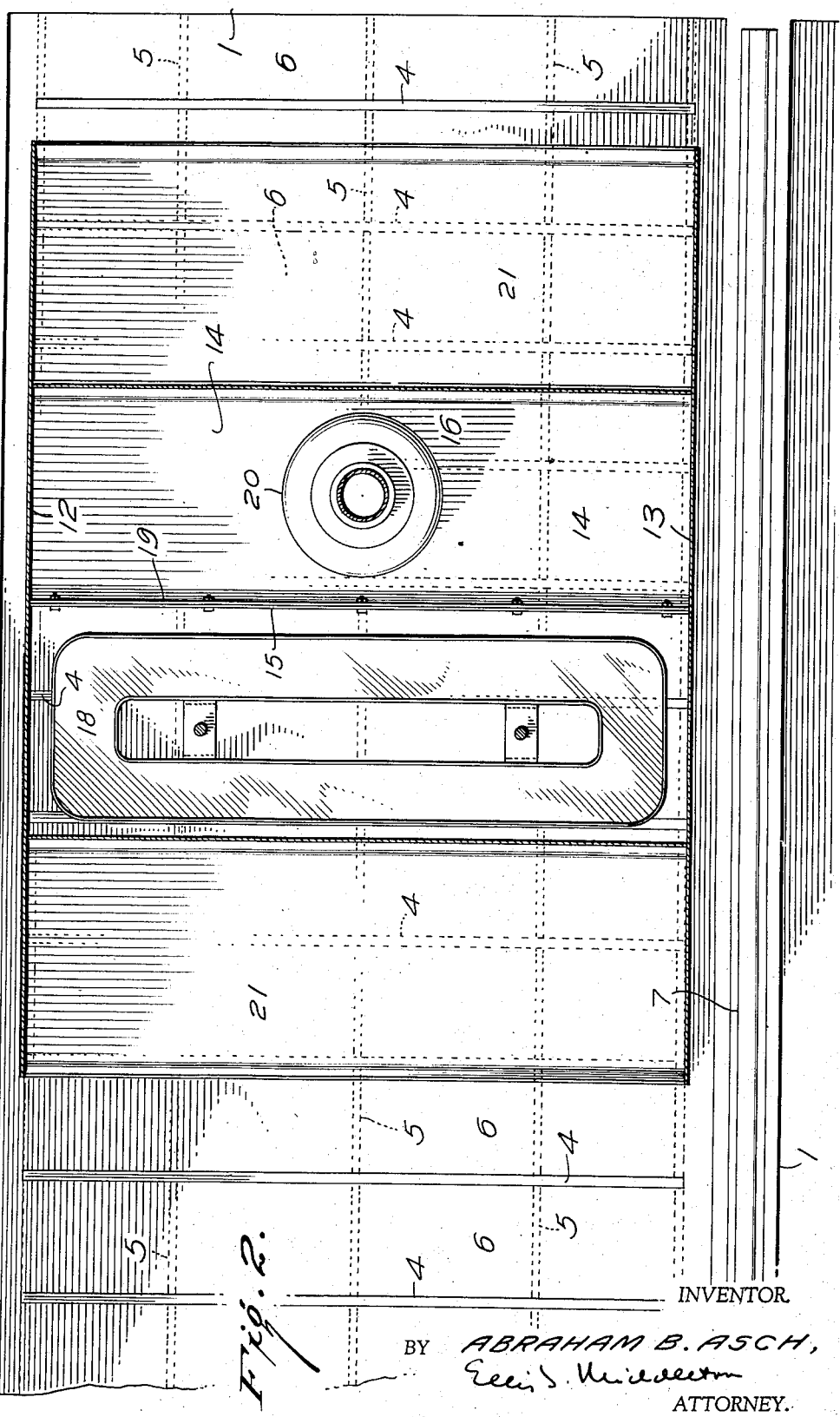
INVENTOR
BY ABRAHAM B. ASCH,
ATTORNEY.

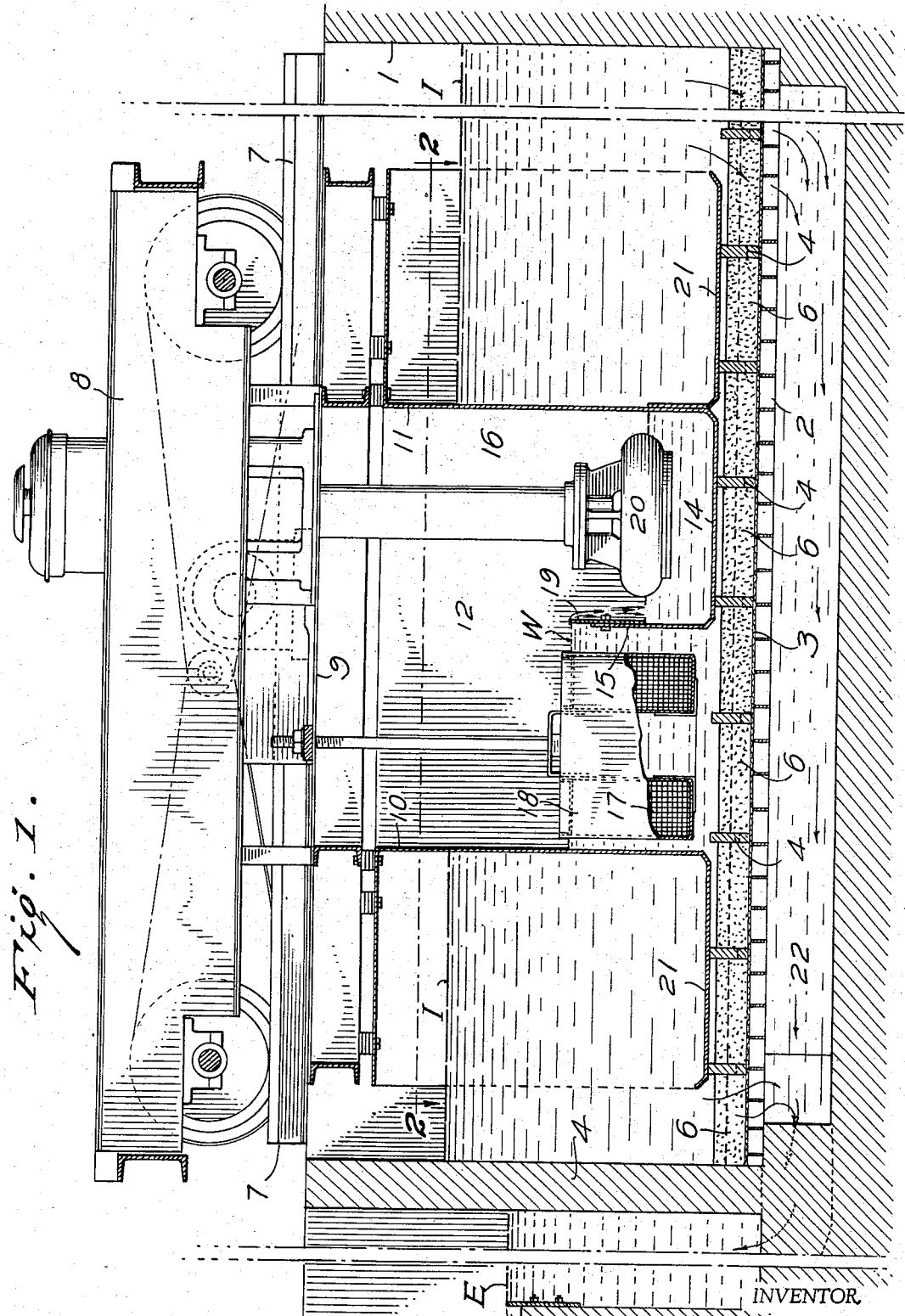

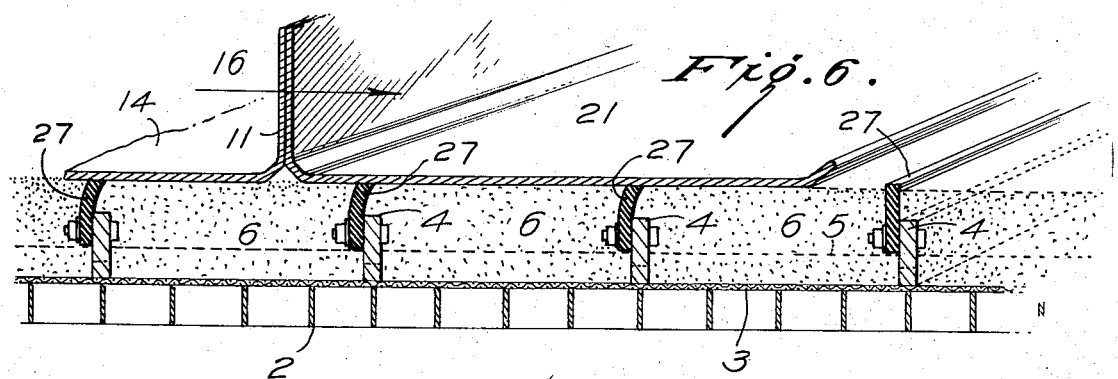
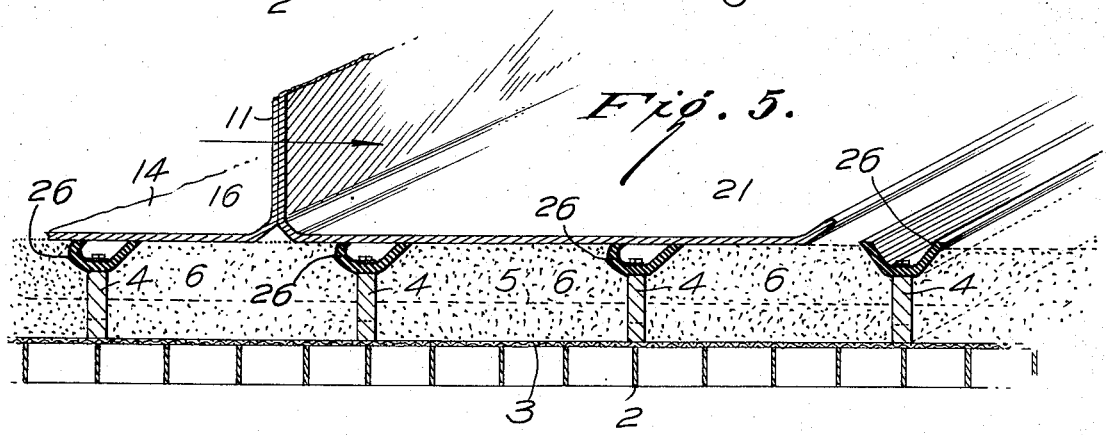
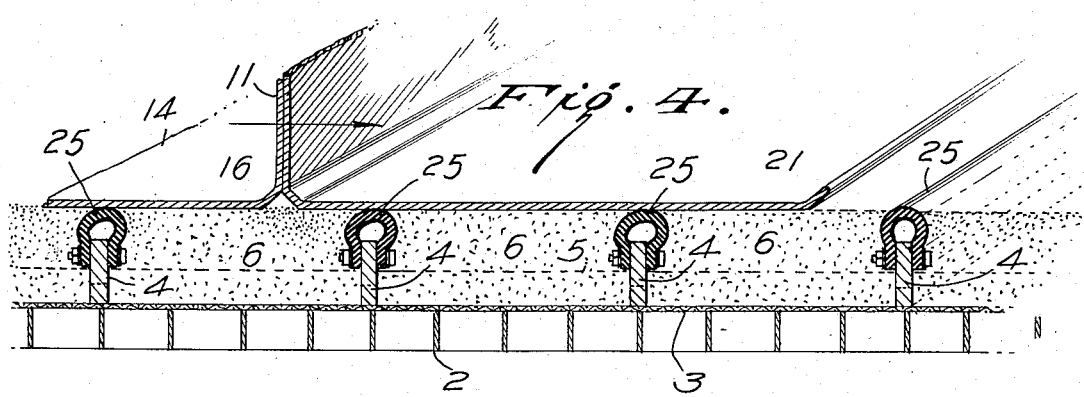
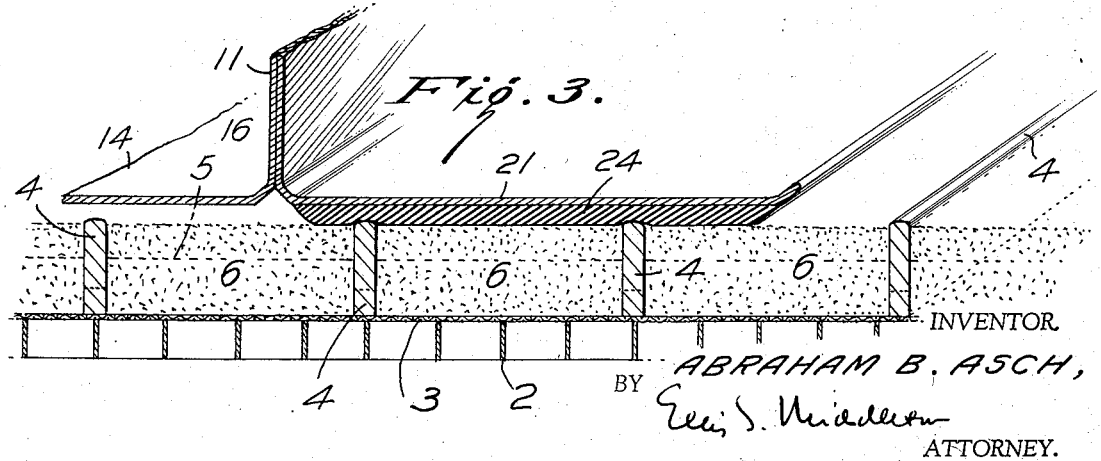

Aug. 11, 1942.  A. B. ASCH  2,292,861
DIVIDED BED AND CLEANER
Filed Sept. 9, 1939  4 Sheets-Sheet 4
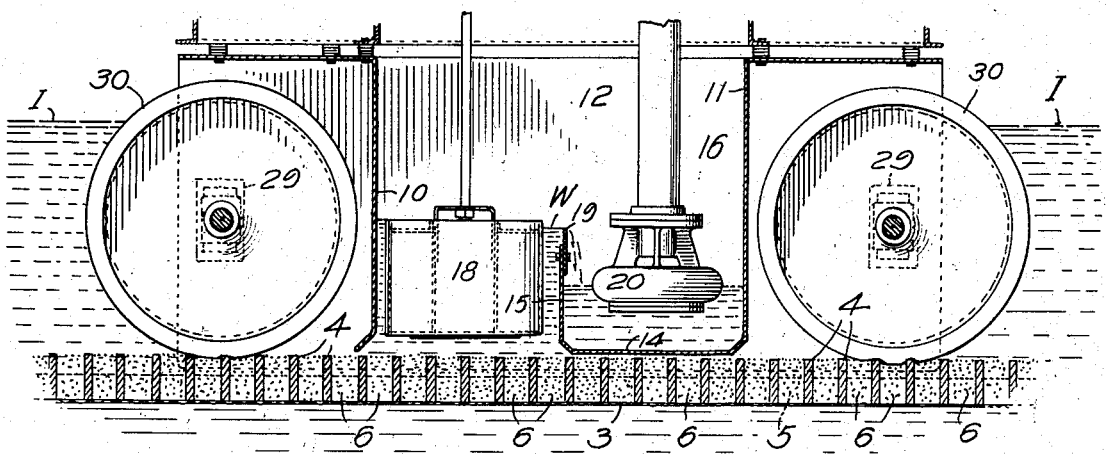
Fig. 7.
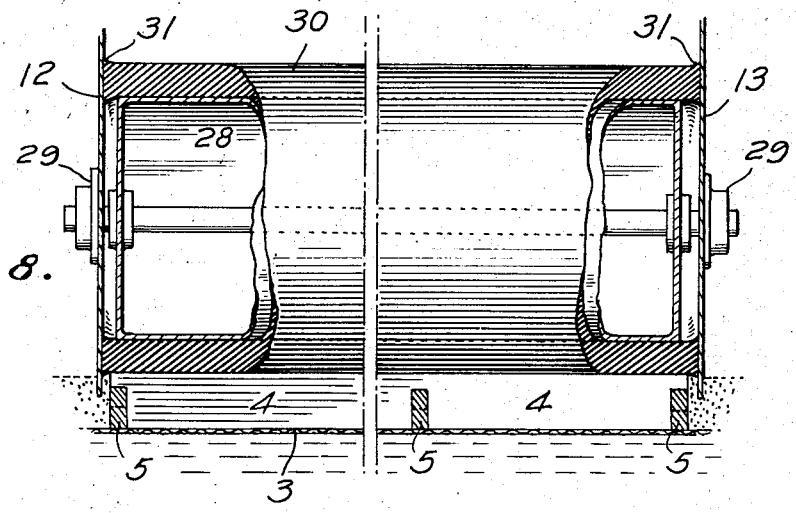
Fig. 8.
Fig. 10.
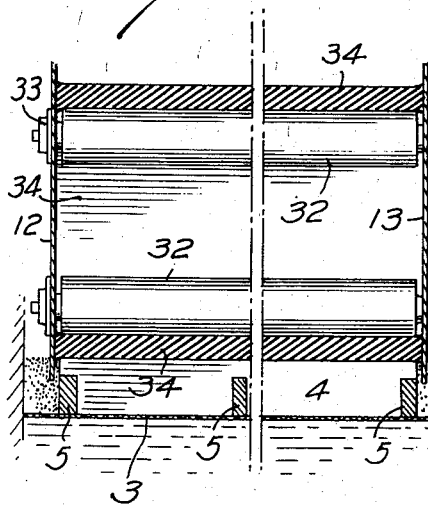
Fig. 9.
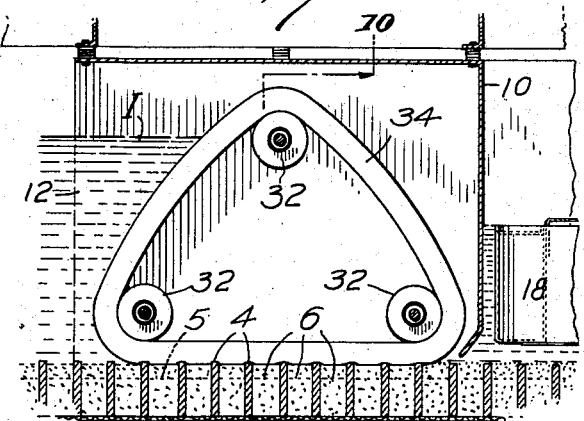
INVENTOR.
ABRAHAM B. ASCH,
BY
ATTORNEY.

Patented Aug. 11, 1942

2,292,861

UNITED STATES PATENT OFFICE 2,292,861

DIVIDED BED AND CLEANER

Abraham B. Asch, Brooklyn, N. Y., assignor, by mesne assignments, to Charles E. Fraser, New York, N. Y.

Application September 9, 1939, Serial No. 294,053

10 Claims. (Cl. 210—128)

The present invention relates to a filter bed and mechanism for cleaning the same.

Such mechanisms may comprise a filter bed over which a cleaner tank is movable and provided with means for creating a zone of agitation in the bed so as to free the bed material in that zone of dirt, which is then washed into a wash water compartment from which it is removed by a pump. Devices of this character are well known both for upflow and downflow filters.

In order to make possible the lowering of elevation of the top of the liquid in the cleaner and to prevent leakage of either the unfiltered influent and/or wash water through the bed and thus contaminate the clean effluent on the other side of the filter, it is imperative that sealing means be provided. Heretofore such cleaning devices made contact with the filter bed medium for this purpose. Sealing the cleaning device makes it possible for the level within the device to be drawn below the level outside by the pump which removes the impurities in suspension. For best operating results, this difference in level must be a substantial amount, and when this difference reaches a certain amount, it will cause the sand to blow into the cleaner, and disrupt the seal, equalizing the levels outside and inside the box and thus reducing the efficiency of the cleaning operation.

To overcome this inherent difficulty of sand seals, this invention describes a method whereby a positive seal may be made which in no way depends upon the ability of the sand to withstand the effects of hydraulic velocity.

One of the important objects of the present invention is the provision of positive means for sealing such a moving cleaning device against the entrance or exit of water from desired points.

It is also known that the movement of a cleaning device also results in a shifting of the sand resulting in uneven bed surfaces.

Another important object of this invention is to provide means for overcoming this shifting.

Another important object resides in arranging the bed material in such a way that the area thereof outside of the zone of agitation will be disturbed to a minimum extent.

Other objects will appear as the description proceeds.

To this end, the invention contemplates in one of its broadest aspects, a filter bed composed of segregated areas of filter material. These areas are of relatively limited extent as compared with the entire area of the bed. Such segregation may be obtained by providing a framework of slats or the like arranged both laterally, longitudinally or angularly of the bed so as to form in effect boxes with open tops and bottoms. The bottom edges of each box will be supported by the filter screen on which the bed material rests and the thus formed box will be filled with bed material. As a result, when the cleaner passes over the bed, the fact that the segregated areas of filter bed material are separated by partitions minimizes extended disturbances. This is particularly true for cleaners of the downflow type wherein influent to be filtered is flowed on top of the bed. This inflowing stream, together with the intermittent movement of the cleaning device, has a tendency to disturb the surface of the bed, that is, to cause a shifting of the sand from one location to another. Consequently, when the cleaner moves over the surface, it is difficult to maintain a tight seal between the bottom of the cleaner and the bed itself. This difficulty is minimized in the present instance not only because the individual partitions act as does a jetty on the seashore, but also because the bottom of the cleaner device contacts not with the filter bed material but with the tops of the partitions to maintain a tight seal.

As indicated above, the invention contemplates a sealing contact between the cleaner device or mechanism carried thereby and the tops of the filter bed partitions. This may take the form of one or more shoes or the like in front of and/or behind the cleaner mechanism so as to make a sliding contact with the tops of the partitions, or the cleaner device may be provided with rollers in front of and/or behind the same making a rolling contact with the partitions, or a travelling trackway may be similarly arranged to make extended contact with such partitions. In all cases, it is desirable that one of the contact surfaces, that is, either that of the tops of the partitions or the contacting device carried by the cleaner should be of a yielding nature, such as of rubber or the like, so as to assist in the maintenance of the tight seal, although this is not essential if a tight seal can be otherwise obtained.

The invention further contemplates the novel combination, arrangement and construction of parts more fully hereinafter described and shown in the accompanying drawings.

In the drawings:

Fig. 1 is a side elevation partly in section showing the relationship of the parts in one form of the invention;

Fig. 2 is a partial plan view along the line 2—2 of Fig. 1;

Fig. 3 is a partial perspective sectional elevation showing a method of making contact with the shoe and the partitions;

Figs. 4, 5 and 6 are similar views of modified forms;

Fig. 7 is a side elevation partly in section showing the use of sealing rollers;

Fig. 8 is an end view of the device of Fig. 7;

Fig. 9 is a fragmentary side elevation showing a travelling trackway modification; and Fig. 10 is a sectional view along the line 10—10 of Fig. 9.

Referring now with particularity to the embodiment illustrated in Figs. 1 and 2, a filter tank is shown generally at 1 of concrete or the like, near the bottom of which is supported a grill-work 2 carrying a screen 3, upon which is supported a cross framework, preferably composed of laterally extending members 4, and longitudinally extending members 5. In annular tanks, the longitudinally extending members 5 will be arranged concentrically therewith, while the members 4 will extend radially. Inasmuch as the invention is equally applicable to rectangular and annular beds, the same description will apply to either situation.

It will be seen from Fig. 2 that the partitions 4 and 5 constitute boxes which, in cooperation with the screen 3, are adapted to contain the filter bed material 6. This bed material may be of any desired character such as sand of either the silicate or magnetite variety, although in the present instance, I have shown the latter type. It has been found desirable that the normal level of the bed material be slightly below the upper level of the partitions 4.

Mounted above the tank and preferably upon the tops of the walls 1 thereof, is a track 7 upon which is a motor driven travelling carriage 8 from which depends the cleaner mechanism indicated generally at 9. This cleaner may consist of end walls 10 and 11 and side walls 12 and 13. The latter project downwardly into the sand of the filter bed material beyond the side partitions 5 so as to make a sealing contact between the cleaner and the bed at this point.

At the bottom of the cleaner, walls 14 and 15 divide the main portion thereof into a wash water compartment 16 and a compartment 17 to receive a device for causing agitation. In this case, it consists of an annular solenoid 18 connected with a suitable source of current for intermittently energizing the same. The top of wall 15 is provided with an adjustable weir 19 while in the wash water compartment is a pump 20 for removing dirty water therefrom.

In front of and/or behind the cleaner mechanism, are shoes 21 projecting a requisite distance from the walls 10 and/or 11. These shoes are adapted to make contact with the tops of the cross partitions 4, the partitions being spaced close enough or the shoe extending far enough so that there will always be contact between the shoe and at least one partition. The shoe may contact with more than one partition, at any time, thus assuring more certain sealing contact.

In operating a filter as above constructed and of the downflow type, influent to be filtered is flowed on top of the filter bed from any desired source and either with or without prior treatment, until a level I has been reached. This level is maintained by the resistance of the sand to the passage of the liquid and the outlet overflow level. The liquid influent passes through the filter bed 6, the solids are retained thereby and the clean effluent drops from beneath the bed into the channel 22 from which it is disposed of as desired. An adjustable weir 23 is provided in the effluent disposal system so as to maintain a level E lower than the level I. This difference in hydrostatic head causes the flow of liquid through the filter. It is to be noted that under these circumstances, the walls 12 and 13 of the cleaner device being embedded in the sand of the filter bed outside of partitions 4 and 5, and the bottom of shoes 21 contacting with the tops of partitions 4, the cleaner tank 9 is sealed against the entrance of influent thereinto.

When it is desired to clean the bed, the travelling carriage 8 may be moved continuously over the bed where it is of the annular variety or back and forth over one of the rectangular type. The solenoid 18 is then intermittently energized, upon which the magnetite sand of the bed 6 immediately therebelow is lifted and thereby agitated. The solenoid is then de-energized, which permits the magnetite to drop back to its place in the bed. During this lifting and falling of the sand, the solids caught thereby are loosened and freed therefrom. Due to the fact that the clean effluent level E is higher than the top of weir 19, the latter establishing the wash water level W, there will be a backflow of clean effluent up through the bed and through the area of lessened resistance due to this movement of the sand, so as to wash the loose dirt over the top of weir 19 and into the compartment 16 from which it is removed by the pump 20. Inasmuch as this level E is always maintained higher than the level W, there can never be back leakage of dirty water from the solenoid compartment through the area of lessened resistance in the filter immediately beneath the same so as to contaminate the clean effluent below the filter.

Ordinarily, the partitions 4 would be made of wood or the like so as to assure a good sealing contact with the bottom of the shoes 11. However, this is not necessary and any other suitable material may be used.

In Fig. 3, the bottom of the shoe 21 is covered with a sheath 24 of rubber or the like as this forms a particularly efficient type of seal. Similarly, in Fig. 4 rubber is used to facilitate the sealing contact. In this case, rubber wipers 25 are attached to the tops of the partitions 4.

These rubber wipers may also take the form shown at 26 in Fig. 5 and 27 in Fig. 6.

Another very effective manner of maintaining a seal fore and aft of the cleaner tank is shown in Figs. 7 and 8. This consists of hollow rollers 28 mounted in journals 29 carried by the side walls 12 and 13. The rollers are surfaced with a layer 30 of yieldable material such as rubber or the like, which extends beyond the ends of the rollers 28 so as to make a wiping contact with the side walls at 31. As shown in Fig. 7, the rollers 28 provide contact with the tops of one or more of the partitions 4 and thus effectively seal the cleaner compartment against the entrance of unfiltered influent. Of course, the level I is to be maintained below the tops of the rollers 28.

By permitting a certain amount of water to enter the hollow rollers 28, any desired degree of weight may be thus obtained and, consequently, more pressure brought to bear between the yieldable surface 30 and the tops of the partitions 4. This roller type of seal is also desirable in that it does not require as much power for propelling the cleaning device as does the wiping seal previously described. Where desired, the rollers themselves may be independently and synchronously driven from the prime mover used to propel the cleaner carriage mechanism.

In Figs. 9 and 10, another form of seal is shown to consist of idlers 32 mounted in bearings 33 carried by the side walls 12 and 13 and around which extends a yieldable travelling trackway 34 of rubber or the like making an extended surface contact with the tops of a plurality of partitions 4.

As in the case of the buoyant rollers 28, one or more of these pulleys 32 may serve as a drive for the trackway or the device may be driven under the impetus of movement of the cleaner mechanism itself.

It will be seen, therefore, that an effective seal is obtainable in front of and behind the cleaner by the wiping, rolling, or trackway seal with the partition tops and at the sides of the cleaner by reason of the fact that the side walls project downwardly a sufficient distance into the bed material.

While the invention has been shown and described with particular reference to specific embodiments, it is to be understood that it is not to be limited thereto but is to be construed broadly and restricted solely by the scope of the appended claims.

I claim:

1. In combination, a reservoir having a filter bed adjacent the bottom thereof with partitions for dividing the bed into separated areas of filter material, a travelling cleaner for said bed carrying means engaging the partitions and cooperating therewith to form a chamber over a portion of the filter bed, means for moving the cleaner over the filter bed, means carried by the cleaner to agitate a portion of the bed within said chamber, and means for removing the cleaning liquid from said chamber.

2. The combination of claim 1 with other portions of the cleaner in sealing engagement with the filter bed material.

3. The combination of claim 1 in which the cleaner engages the partitions in a sliding contact.

4. The combination of claim 1 in which the cleaner engages the partition in a sliding contact, one of said members carrying a rubber wiper.

5. The combination of claim 1 in which the cleaner engages the partitions through the instrumentality of a roller at each end thereof.

6. The combination of claim 1 in which the cleaner engages the partitions through the instrumentality of a roller at each end thereof, said roller having a yielding rubber surface.

7. The combination of claim 1 in which the cleaner engages the partitions through the instrumentality of a travelling yieldable trackway having a bottom area sufficient to bridge a plurality of partitions.

8. The combination of claim 1 with other portions of the cleaner in sealing engagement with the filter bed material, one of the partitions with which the cleaner makes contact being ahead of the cleaner and another being behind the same.

9. A filter bed including a screen, a framework supported thereon and comprising partitions extending substantially across the bed forming areas of less extent than that of the total filter bed, each of said partitions having a flexible wiping portion at the upper part thereof, and filter bed material in between the partitions and below the top thereof.

10. In a cleaning mechanism for a reservoir having a filter bed adjacent the bottom thereof with partitions for dividing the bed into separated areas of filter material, the combination of a track carried by the walls of said reservoir, a travelling cleaner for said bed supported on said track to move over said filter bed and carrying means engaging the partitions and cooperating therewith to form a chamber over a portion of the filter bed, means carried by the cleaner to agitate a portion of the bed within said chamber and means for removing the cleaning liquid from said chamber.

ABRAHAM B. ASCH.